United States Patent

Terashima et al.

[11] Patent Number: 5,932,504
[45] Date of Patent: Aug. 3, 1999

[54] GLASS COMPOSITION AND MAGNETIC HEAD EMPLOYING GLASS COMPOSITION

[75] Inventors: Hideki Terashima; Tetsuo Shimada, both of Miyagi, Japan

[73] Assignee: Sony Corporation, Tokyo, Japan

[21] Appl. No.: 08/831,412

[22] Filed: Apr. 1, 1997

[30] Foreign Application Priority Data

Apr. 1, 1996 [JP] Japan ................................. 8-079025

[51] Int. Cl.$^6$ ............................ C03C 3/072; G11B 5/235
[52] U.S. Cl. ............................................. 501/75; 360/120
[58] Field of Search ................................ 501/73, 74, 75, 501/77; 428/693, 694 ST; 360/110, 120

[56] References Cited

U.S. PATENT DOCUMENTS 4,721,690  1/1988  Ross et al. ................................. 501/60

FOREIGN PATENT DOCUMENTS 2-137745  5/1990  Japan .
8-169727  7/1996  Japan .

*Primary Examiner*—John J. Zimmerman
*Assistant Examiner*—Michael LaVilla
*Attorney, Agent, or Firm*—Hill & Simpson

[57] ABSTRACT

A glass composition contains PbO of 67 to 74 weight %, $SiO_2$ of 11 to 20 weight %, $B_2O_3$ of 3 to 8 weight %, $TeO_2$ of 3 9 weight %, $Na_2O$ of 0 to 3 weight %, and $ZrO_2$ of 1 weight % smaller (except 0). A magnetic head according to the present invention includes a gap forming material, a spacing filling material, a bonding material, or an insulating material for a magnetic head. The gap forming material, the spacing filling material, the bonding material, or the insulating material is made of a glass composition containing PbO of 67 to 74 weight %, $SiO_2$ of 11 to 20 weight %, $B_2O_3$ of 3 to 8 weight %, $TeO_2$ of 3 to 9 weight %, $Na_2O$ of 0 to 3 weight %, and $ZrO_2$ of 1 weight % or smaller (except 0).

2 Claims, 5 Drawing Sheets

F I G. 4
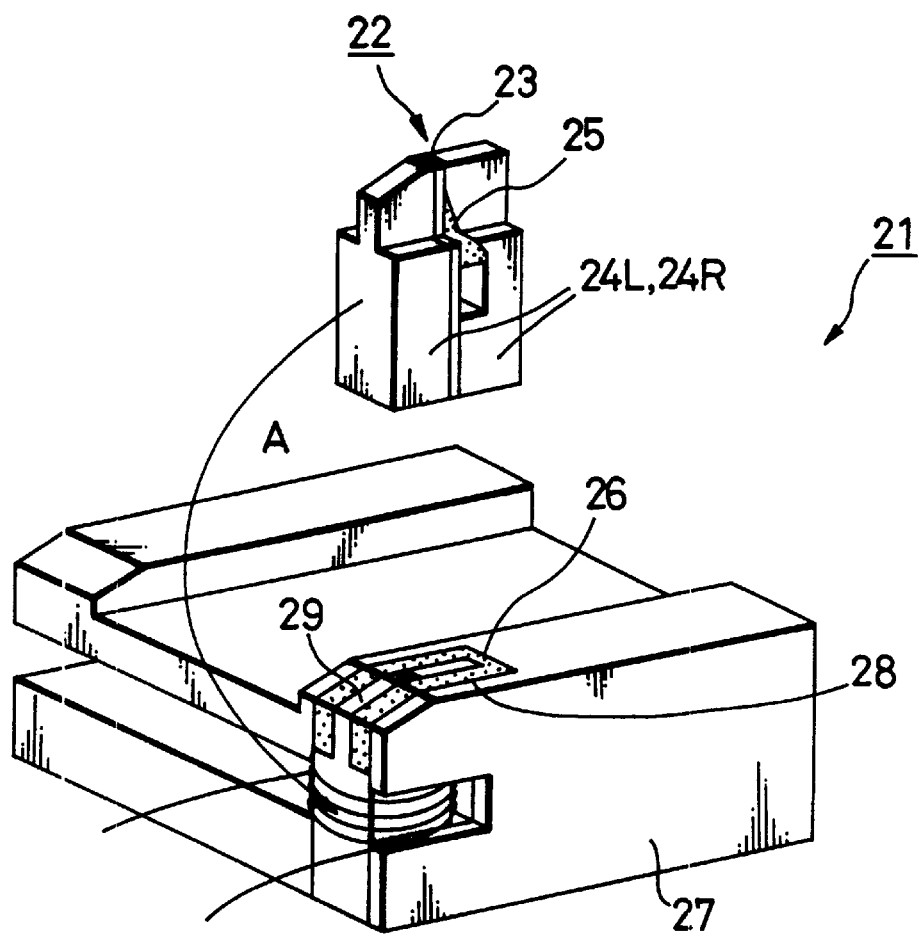

GLASS COMPOSITION AND MAGNETIC HEAD EMPLOYING GLASS COMPOSITION

BACKGROUND OF THE INVENTION

1. Field of the Invention

The present invention relates to a glass composition having both of a low melting point and a practical chemical resistance and a magnetic head employing it.

2. Description of the Related Art

A magnetic head has employed as a gap forming material, a spacing filling material, a bonding material or as an insulating material a glass with a low melting point containing some components such as silicon dioxide ($SiO_2$), lead oxide (PbO), sodium oxide ($Na_2O$), diboron trioxide ($B_2O_3$) or the like.

However, the above composition involves inconsistent relationship between a melting point of a glass and a chemical resistance thereof in which, when one is dominated, the other is deteriorated. Specifically, in order to set a melting point of this kind of glass lower, a large amount of PbO and alkali metal oxide are contained in the glass, which deteriorates the chemical resistance thereof. On the other hand, in order to improve the chemical resistance of the glass, a large amount of $SiO_2$ are contained therein, which increases the melting point thereof.

Specifically, in general, a large number of magnetic-head materials such as a magnetic-core material or the like have characteristics in which its magnetic characteristic is deteriorated at high temperature. In a magnetic head manufacturing process, a glass is molten and bonded at a temperature at which a normal viscosity thereof becomes $10^3$pa.s (hereinafter referred to as a bonding point) and then soaked in a grinding fluid or the like. Therefore, when the above glass composition is employed, if priority is given to fabrication of a glass having a lower melting point in order to prevent the magnetic characteristic of the magnetic head from being deteriorated, then a glass portion of the magnetic head is chemically damaged in the manufacturing process thereof. If on the other hand priority is given to fabrication of the glass having the chemical resistance, then the magnetic head cannot have a high magnetic characteristic required for a magnetic head.

Specifically, since a melt-bonding glass employed as a bonding material or the like in the magnetic-head manufacturing process is soaked in a grinding fluid and a washing solution both having alkalinity (about PH9 to 11) when a bonded block is ground and processed, the melt-bonding glass must have excellent chemical resistance and particularly excellent alkali resistance. For this end, only employment of the glass having a melt-bonding temperature of 700° C. or higher could provide a result satisfying both of the above requirements.

In order to solve the above problems, the assignee of the present invention proposed in Japanese patent publication No. 315037/1994 a glass composition having both of the low melting point and the chemical resistance and a magnetic head which realized improvement of a quality thereof by using the glass composition.

The above glass composition contains PbO of 60 to 65 weight %, $SiO_2$ of 20 to 26 weight %, $B_2O_3$ of 2 to 10 weight %, tellurium dioxide ($TeO_2$) of 3 to 8 weigh %, $Na_2O$ of 0 to 5 weight %, and zirconium dioxide ($ZrO_2$) of 1 to 3 weight % and has the bonding temperature of 580° C. to 650° C. In particular, the glass composition contains $TeO_2$ and $ZrO_2$ and hence has a lower melting point and an improved chemical resistance.

However, if a lower melting point of a glass is required, the above glass composition encounters the problems. Especially, if the glass having the melt-bonding temperature of about 580° C. to 650° C. is selected as a melt-bonding glass used in the magnetic-head manufacturing process using an amorphous metal as described above, employment of such glass enhances crystallization of the amorphous metal, which deteriorates the magnetic characteristic of the magnetic head. Therefore, in order to keep the magnetic characteristic of the amorphous metal effective, it is necessary to bond the amorphous metal with a glass capable of being bonded thereto at a temperature which is as low as possible as compared with a crystallization temperature of the amorphous metal.

Moreover, when the magnetic head is assembled through two or more glass bonding processes, a glass employed in the second and succeeding glass melt-bonding processes must be bonded at a temperature lower than a glass transition point of a glass used in the first glass melt-bonding process. If the glass employed in the second glass melt-bonding process is not bonded at such temperature, then a meltbonded portion bonded in the first glass bonding process is molten or the like again, which prevents the magnetic head from having a predetermined dimension. Therefore, the glass employed in the second and succeeding glass meltbonding processes is required to have the melt-bonding point of about 550° C. or smaller, and hence the glass composition having the melt-bonding temperature ranging substantially from 580° C. to 650° C. cannot be employed in the second and succeeding glass melt-bonding processes.

In the general magnetic-head manufacturing process, a melt-bonding glass used for the bonding is usually meltbonded at a temperature at which its viscosity is about $10^3$Pa.s as described above, and soaked in the grinding fluid and the washing solution in the succeeding processing processes. Consequently, the above glass composition is inevitably involved in the problem that if priority is given to the lower melting point of the glass composition, then the glass portion is chemically damaged in the manufacturing process and, contrary, if priority is given to the chemical resistance thereof and hence the melting point thereof is set higher, then the magnetic characteristic of the magnetic core is deteriorated or the glass melt-bonded in the previous process is molten, thereby a dimension accuracy of the magnetic head becoming unsatisfactory. In particular, since the above melt-bonding glass employed in the magnetic head is required to have a remarkably low melt-bonding temperature, when the glass having the low melting point and the above composition is employed, the glass starts being dissolved in the grinding fluid or the like in the magnetic-head manufacturing or working process, which causes a considerable bump on the glass and cracks the glass. Thus, it frequently becomes difficult to form a shape of the magnetic head.

Specifically, since, when a head block is worked or processed after the glass is melt-bonded, the head block is soaked in the grinding fluid and the washing solution having alkalinity (about PH9 to PH11), the bonding glass employed in the magnetic head must have excellent chemical resistance and particularly the excellent alkali resistance. For this end, the proposed glass composition described above must contain the glass having the melt-bonding temperature of about 580° C. or higher. However, in order to give priority to the magnetic characteristic and the dimension accuracy of the magnetic head, the magnetic head inevitably employs the melt-bonding glass having the low melt-bonding temperature lower than 550° C. Employment of such magnetic head provides unsatisfactory yield of the magnetic head upon the processing and further provides unsatisfactory reliability.

SUMMARY OF THE INVENTION

In view of such aspects, it is an object of the present invention to provide a glass composition and a magnetic head employing the glass composition which can solve the above problems and particularly to obtain a glass composition having both of a low melting point and a practical chemical resistance and a magnetic head employing the glass composition.

According to a first aspect of the present invention, a glass composition contains PbO of 67 to 74 weight %, $SiO_2$ of 11 to 20 weight %, $B_2O_3$ of 3 to 8 weight %, $TeO_2$ of 3 to 9 weight %, $Na_2O$ of 0 to 3 weight %, and $ZrO_2$ of 1 weight % or smaller (except 0).

According to a second aspect of the present invention, a magnetic head employing a glass composition according to the present invention includes a gap forming material, a spacing filling material, a bonding material, or an insulating material for a magnetic head. The gap forming material, the spacing filling material, the bonding material, or the insulating material is made of a glass composition containing PbO of 67 to 74 weight %, $SiO_2$ of 11 to 20 weight %, $B_2O_3$ of 3 to 8 weight %, $TeO_2$ of 3 to 9 weight %, $Na_2O$ of 0 to 3 weight %, and $ZrO_2$ of 1 weight % or smaller (except 0).

BRIEF DESCRIPTION OF THE DRAWINGS

FIG. 4 is a perspective view showing a magnetic head for a hard disk to which the present invention is applied.

DESCRIPTION OF THE PREFERRED EMBODIMENT

Figure 1:
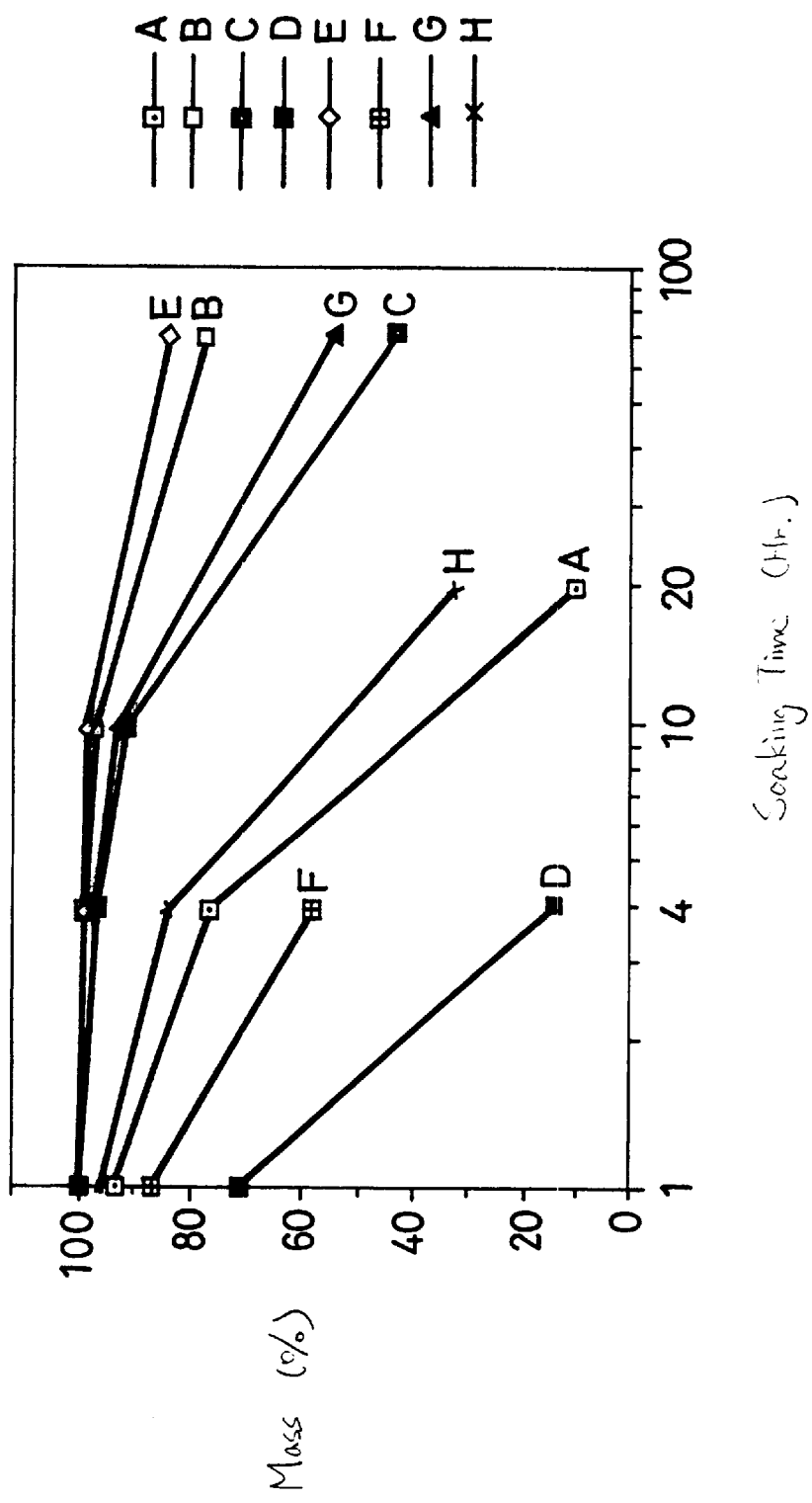
FIG. 1 is a graph showing a chemical resistance of melt-bonding glass samples according to the present invention and a comparative example.

A glass composition according to an embodiment of the present invention hereinafter be described with reference to FIG. 1 and Table 1.

Table 1 shows content by weight percentages of samples A, B, C of the glass composition according to this embodiment and samples D to H of glass compositions according to comparative examples.

TABLE 1

|  | embodiment | | | comparative example | | | | |
|---|---|---|---|---|---|---|---|---|
| composition | A | B | C | D | E | F | G | H |
| PbO | 73.0 | 67.5 | 70.0 | 71.0 | 71.0 | 70.0 | 60.5 | 67.5 |
| $SiO_2$ | 13.0 | 20.0 | 17.0 | 10.0 | 18.0 | 10.0 | 18.1 | 12.5 |
| $B_2O_3$ | 8.0 | 5.5 | 6.0 | 9.0 | 4.0 | 10.0 | 9.3 | 10.0 |
| $TeO_2$ | 5.0 | 4.0 | 5.0 | 9.0 | 4.0 | — | — | — |
| $Na_2O$ | — | 2.0 | 1.0 | — | 1.0 | — | 2.8 | — |
| $ZrO_2$ | 1.0 | 1.0 | 1.0 | 1.0 | 2.0 | — | — | — |
| $Bi_2O_3$ | — | — | — | — | — | 10.0 | 9.3 | 10.0 |

TABLE 1-continued

|  | embodiment | | | comparative example | | | | |
|---|---|---|---|---|---|---|---|---|
| composition | A | B | C | D | E | F | G | H |
| thermal expansion coefficient $\alpha \times 10^{-7}$ [° C.$^{-1}$] | 101 | 105 | 102 | 109 | 100 | 103 | 100 | 96 |
| melt-bonding temperature Tw [° C.] | 500 | 540 | 520 | 490 | 560 | 500 | 580 | 520 |

(note) Composition is indicated by weight %. Temperature range of thermal expansion coefficient of samples E and G is 100 to 350° C. and those of other samples are 100 to 300° C.

Although a glass is a general term of amorphous solid material having no definite melting point and no definite solidifying point, a melt-bonding glass containing a large amount of PbO and a low softening point will be described.

For example, to obtain a melt-bonding glass employed in a magnetic head, each of composition materials having a weight % shown in samples A to C of Table 1 is prepared and dissolved and mixed in a platinum crucible at a temperature of 1100° C. to 1300° C. for about an hour. The obtained melt-bonding glass is used after shaped like a rod.

Specifically, the sample A has the composition containing PbO of 73.0 weight %, $SiO_2$ of 13.0 weight %, $B_2O_3$ of 8.0 weight %, $TeO_2$ of 5.0 weight %, and $ZrO_2$ of 1.0 weight %. The sample B has the composition containing PbO of 67.5 weight %, $SiO_2$ of 20.0 weight %, $B_2O_3$ of 5.5 weight %, $TeO_2$ of 4.0 weight %, $Na_2O_2$ of 2.0 weight % and $ZrO_2$ of 1.0 weight %. The sample C has the composition containing PbO of 70.0 weight %, $SiO_2$ of 17.0 weight %, $B_2O_3$ of 6.0 weight %, $TeO_2$ of 5.0 weight %, $Na_2O_2$ of 1.0 weight % and $ZrO_2$ of 1.0 weight %.

Characteristics of the melt-bonding glass samples A to C obtained as described above are shown in Table 1. Thermal expansion coefficients and melt-bonding temperatures thereof are shown at the lowest two rows in Table 1. The melt-bonding temperatures of the samples A, B, C are respectively 500° C., 540° C., and 520° C.

The melt-bonding glass samples A, B, C according to the embodiment shown in Table 1 have such excellent characteristics that they have low melting points and practical chemical resistances (water resistance and alkali resistance).

The samples A to H shown in Table 1 were checked in alkali resistance. In this alkali resistance test, vessels respectively containing the obtained samples A to H which were rod-shaped glass were prepared and each of the rod-shaped samples A to H in the vessels had a diameter of 0.45 mm and a length of 50 mm.

Sodium hydroxide (4N—NaOH) solution serving as a heavily alkaline material was filled in each of the vessels by a constant amount to soak each of the samples A to H therein.

FIG. 1 is a graph showing results obtained when weights of the samples A to H were measured as time passed. In FIG. 1, an abscissa represents a soaking time (Hr) and an ordinate represents a mass change rate (%) of the melt-bonding glass sample obtained when the alkali dissolved the melt-bonding glass. Study of this test reveals that it can be judged that the smaller the weight of the sample is reduced, the higher alkali resistance the sample has. Study of FIG. 1 reveals that the mass of the sample F is reduced earlier as compared with that of the sample A, that the mass of the sample H is reduced earlier as compared with that of the sample C, and that the mass of the sample G is reduced earlier as compared with that of the sample B.

The melt-bonding glass samples A to C according to this embodiment will be described with reference to Table 1 and FIG. 1. For example, as shown in Table 1, the melt-bonding temperature of the sample A according to this embodiment is 500° C. and the melt-bonding temperature of the sample F according to the comparative example is substantially similar (500° C.). However, the alkali resistance of the sample A is different from that of the sample F. Study of the alkali resistance shown in FIG. 1 reveals that a mass conservation rate (which is a ratio of a measured mass to an initial mass and whose initial value is 100%) obtained after the samples F was soaked for four hours was 58%, while the mass conservation rate of the sample A obtained after it was soaked for four hours was 77%. This fact shows that the sample A according to this embodiment has more satisfactory alkali resistance as compared with the sample F. Particularly, while a melt-bonding glass surface of the sample F was considerably cracked and discolorated, the material A was free from crack and discoloration.

Similarly, the sample C according to this embodiment and the sample H according to the comparative example both having the melt-bonding temperatures of 520° C. were compared. Study of the alkali resistance reveals that while the mass conservation rate of the sample H obtained after it was soaked for four hours was about 83%, the mass conservation rate of the sample C obtained after it was soaked for four hours was about 97% and it takes about thirteen hours for the mass conservation rate of the sample C to become about 83%. In this case, both of the samples C and H were free from crack and decoloration. Specifically, the sample C shows alkali resistance higher than that of the sample H.

Further, the sample B having the melt-bonding temperature of 540° C. according to this embodiment and the sample G having the bonding temperature of 580° C. according to the comparative example were compared. Although the sample G has the melt-bonding temperature which is higher than that of the sample B by 40° C., study of the alkali resistance shown in FIG. 1 reveals that the mass conservation rate of the sample B obtained after it was soaked for seventy-two hours was 76% but the mass conservation rate of the sample G obtained after it was soaked after seventy-two hours was about 53%. This fact shows that the sample B according to this embodiment has more satisfactory alkali resistance as compared with the sample G.

The sample D according to the comparative example shown in Table 1 has $SiO_2$ of 10 weight % smaller by 1 weight % as compared with a minimum value of a composition range from 11 to 20 weight % of $SiO_2$ of the glass composition according to this embodiment and $B_2O_3$ of 9 weight % larger by 1 weight % as compared with a maximum value of a composition range from 3 to 8 weight % of $B_2O_3$ of the glass composition according to this embodiment. However, the alkali resistance of the sample D is considerably unsatisfactory even as compared with the sample F according to comparative example shown in FIG. 1.

Further, the sample E according to the comparative example shown in Table 1 has $ZrO_2$ of 2 weight % larger by 1 weight % as compared with a maximum value of a composition range of 1 weight % or smaller of $ZrO_2$ of the glass composition according to this embodiment. As shown in FIG. 1, while the sample E has more excellent chemical resistance as compared with the sample B according to this embodiment, the sample E has the melt-bonding temperature of 560° C. which is extremely high as shown in Table 1. Study of this fact reveals that the sample E is not a melt-bonding glass composition which can satisfy both requirements for the satisfactory chemical resistance and the low melting point.

Study of the above tests reveals that the samples A to C shown in Table 1 are the glass compositions excellent in the melt-bonding temperature, the alkali resistance, the thermal expansion coefficient and so on and hence have the characteristics suitable for use in the magnetic head.

According to the present invention, it is possible to obtain the melt-bonding glass composition satisfying both of the lower melting point and the chemical resistance by selecting PbO within the composition range of from 67 to 74 weight %, $SiO_2$ within the composition range of from 11 to 20 weight %, $B_2O_3$ within the composition range of from 3 to 8 weight %, $TeO_2$ within the composition range of from 3 to 9 weight %, $Na_2O$ within the composition range of from 0 to 3 weight % and $ZrO_2$ within the composition range of 1 weight % or smaller (except 0 weight %). Therefore, it is clear that the glass composition according to the present invention is not limited to the glass composition ranges of the samples A, B, C according to the embodiment shown in Table 1.

The above composition ranges were discovered through various examinations for solving the above problems. Although it is not clear how respective components thereof mutually reacts, the reason for limiting the composition ranges to those described above is as follows.

PbO is a main component of the low melting-point glass. If the composition ratio of PbO is less than 67 weight %, then the melt-bonding temperature of the glass exceeds 550° C. If on the other hand the content by weight percentage of PbO exceeds 74 weight %, then it is impossible to obtain the practical alkali resistance.

$SiO_2$ is an indispensable component for a glass network former and is effective in improvement of the alkali resistance. If the content by weight percentage of $SiO_2$ is less than 11 weight %, then the alkali resistance thereof becomes unsatisfactory similarly to that of the sample D shown in FIG. 1 and further wiredrawing of the glass becomes difficult. If the content by weight percentage of $SiO_2$ exceeds 20 weight %, then the melt-bonding temperature of the glass exceeds 550° C., which causes a problem upon the melt-bonding.

$B_2O_3$ is an indispensable component for a glass network similarly to $SiO_2$. If the content by weight percentage of $B_2O_3$ is less than 3 weight %, then the glass is not stable in composition and the wiredrawing of the glass becomes difficult. If on the other hand the content by weight percentage of $B_2O_3$ exceeds 8 weight %, then satisfactory alkali resistance cannot be presented (see result of the sample D shown in FIG. 1).

$TeO_2$ is a component which improves the alkali resistance without comparatively increasing the melt-bonding temperature by substituting $TeO_2$ for a part of PbO. If the content of $TeO_2$ is lower than 3 weight %, then the above effect of improvement for alkali resistance cannot be achieved. If on the other hand the composition of $TeO_2$ exceeds 9 weight %, then a precipitation material is easily produced in the glass upon the melt-bonding, which makes the wetting of the glass unsatisfactory and cracks in the precipitation portion thereof.

$Na_2O$ serves to increase the thermal expansion coefficient and to lower the melting point of the glass. If the content by weight percentage of the $Na_2O$ exceeds 3 weight %, then it is impossible for the glass composition to achieve the practical alkali resistance. Therefore, the composition range of $Na_2O$ is limited as described above in order to obtain the desired low melting point and desired alkali resistance.

$ZrO_2$ is a component serving to improve the alkali resistance. If the glass composition does not contain $ZrO_2$, then the effect of improvement of the alkali resistance cannot be achieved. If on the other hand the content of $ZrO_2$ by weight percentage is exceeds 1 weight %, then the melting point of the glass becomes high, which causes a problem upon the melt-bonding (see the sample E according to the comparative example shown in Table 1).

Therefore, if the melt-bonding glass such as the samples A, B, C having the above compositions or the like is employed as a gap forming material, a spacing filling material, a bonding material or an insulating material, then it becomes possible to realize the melt-bonding at a low temperature of about 500 to 550° C. Moreover, it is possible to achieve the effect, for example, in which the chemical damage in the magnetic-head manufacturing process or in an environment at a market is reduced and hence the satisfactory magnetic head with an excellent magnetic characteristic can be manufactured with a satisfactory yield.

The glass composition according to this embodiment can provide some high effects when it is applied to a magnetic head using an amorphous metal requiring the melt-bonding at a low temperature of about 510° C. or lower in order to prevent deterioration of its magnetic characteristic and to a nth bonding process (where n is an integer exceeding 1) of the magnetic-head manufacturing process having a plural-time glass melt-bonding processes requiring the melt-bonding carried out at a temperature, which is as low as possible, in order to prevent an error in size caused by the melting of the glass.

An arrangement of a magnetic head in which the glass composition bringing the above effects as the gap forming material, the spacing filling material, the bonding material or the insulating material will hereinafter be described with reference to FIGS. 2 to 5.

Figure 2:
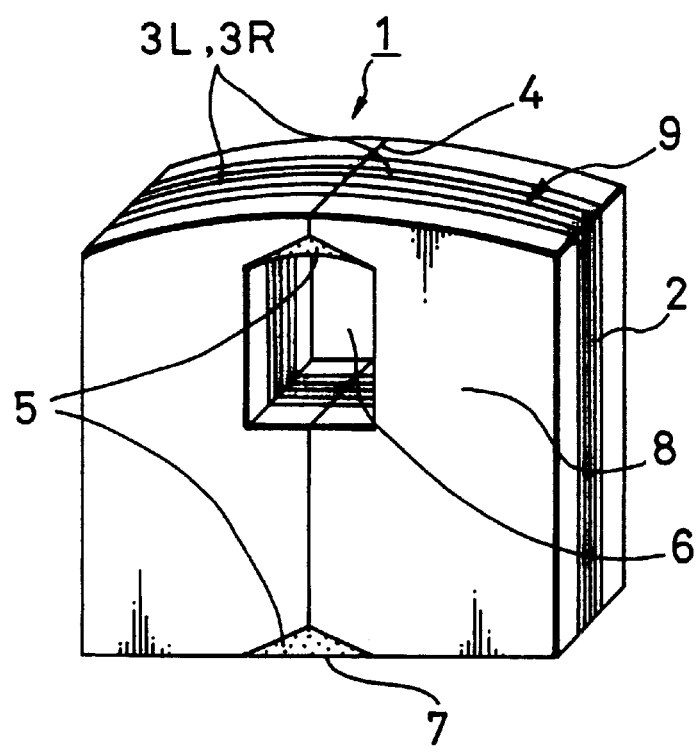
FIG. 2 is a perspective view showing an amorphous metal film laminated head to which the present invention is applied.

FIG. 2 is a perspective view showing an amorphous-metal thin-film laminated head 1. The head 1 is manufactured as follows. Magnetic-core half bodies 3L and 3R formed by laminating a cobalt system amorphous metal magnetic thin film 2 having a crystallization temperature of about 550° C. on a non-magnetic ceramic substrate serving as a guard member 8 by sputtering are opposed to each other. The magnetic-core half bodies 3L and 3R are brought in contact on the magnetic thin film 2 with each other through a gap film (not shown in FIG. 2) to form a gap portion 4. A melt-bonding-glass rod is inserted into a winding groove 6 and a glass bonding groove 7 and molten to fill the grooves 6 and 7 with the glass (the glass 5). Thus, the glass 5 serves as a bonding material for bonding the magnetic-core half bodies 3L and 3R to each other or as both an insulating material for magnetically insulating the magnetic-core half bodies 3L and 3R and a spacing filling material for filling the winding groove 6 and the glass bonding groove 7. Further, a surface with curvature is formed on upper portions of the magnetic-core half bodies 3L and 3R around the gap 4 to form a slide surface 9.

The melt-bonding glass 5 has a glass composition of PbO of 73.0 weight %, $SiO_2$ of 13.0 weight %, $B_2O_3$ of 8.0 weight %, $TeO_2$ of 5.0 weight % and $ZrO_2$ of 1.0 weight % similarly to the sample A according to the embodiment shown in Table 1.

If the melt-bonding temperature of the melt-bonding glass is lower than the crystallization temperature of an amorphous metal (i.e., 550° C. in the above example) by about 30° C., then the amorphous metal starts being crystallized before the amorphous metal is completely crystallized, which brings a deterioration of an output from such head in a high-frequency band of a signal. Therefore, the glass having the composition similar to the sample H according to the comparative example (having melt-bonding temperature of 520° C.) cannot be used for the magnetic head. As a result, the magnetic head according to this embodiment required the glass having the melt-bonding temperature lower than 500° C.

Of the samples D to H of the comparative example, only the sample F has the melt-bonding temperature of 500° C. which satisfies the above requirement.

An amorphous metal thin film laminated head 1 similar to that shown in FIG. 2 was manufactured by using a glass having the same composition as that of the sample F. The amorphous metal thin film laminated heads 1 respectively manufactured by using the sample A and the sample F were compared in view of a shape keeping rate indicative of a degree of a shape kept until the end of the process. Table 2 shows the results of the above comparison.

TABLE 2

| name of used glass | sample A | sample F |
|---|---|---|
| shape keeping rate | 97 to 100% | 0 to 33% |

Specifically, while the shape keeping rate of the head 1 manufacture by using the sample A according to the embodiment was within the range from 97 to 100%, the shape keeping rate of the head 1 manufactured by using the sample F was within the range from 0 to 33% and about ⅔ of the heads 1 manufactured by using the sample F were unsatisfactory goods. Study of the above comparison result reveals that the melt-bonding glasses 5 of most of the heads 1, which failed to keep their shape until the end of the process, were damaged by the grinding fluid and the washing solution during the process and consequently a crack or unevenness is generated therein. When such head having a crack or an uneven surface is slid with respect to a magnetic recording medium such as a tape or the like with being in contact therewith, the head may produce a drop-out of a sound reproduced from the tape. Therefore, such head cannot be used as a head used with a magnetic recording medium.

When the magnetic-core half bodies 3L and 3R are bonded to each other by the melt-bonding glass made of the sample A according to this embodiment instead of the sample F according to the comparative example as described above, the melt-bonding temperature upon the bonding is 500° C. and hence it is possible to manufacture the magnetic head without heating it to a high temperature of 510° C. or higher, which can allow the lower melting point. Moreover, even if the head is soaked in the grinding fluid or the like in the grinding process or the like, a melt-bonding glass 5 portion of the head is hardly damaged and hence kept in the practically usable extent. Therefore, it is possible to produce the high-quality amorphous-metal thin-film laminated head with high yield.

A magnetic head 10 for use with a data cartridge will be described with reference to FIG. 3. The magnetic head 10 has a reproduction gap 11 and a recording gap 12 which are provided in parallel on its slide surface 13. The magnetic head 10 is a composite head in which the reproduction gap 11 side of the head 10 is arranged as a ferrite head 14 and the recording gap 12 side thereof is arranged as a metal-in-gap (MIG) head 15.

The ferrite head 14 is formed by melt-bonding ferrite half bodies 14A and 14B to each other with a melt-bonding glass 16 used for a first melt-bonding process. The MIG head 15 is formed by bonding a ferrite half body 18 to the ferrite half body 14B of the ferrite head 14 with a melt-bonding glass 17 used for a second melt-bonding process. A $SiO_2$ film 20 is formed through a crystalline metal magnetic film 19 such as sendust or the like at the recording gap 12 portion of the ferrite half body 18 of the MIG head 15, thereby a gap width being determined. Therefore, the melt-bonding glass 17 used for the second melt-bonding process enters the inside of the recording gap 12 (and flows therein on the upper side of the $SiO_2$ film 20) to form a part of a gap film. Thus, the melt-bonding glass 17 serves as a gap forming material, a spacing filling material, a bonding material or an insulating material.

When the magnetic head 10 shown in FIG. 3 was manufacture, the ferrite half bodies 14A and 14B of the reproduction gap side ferrite head 14 were melt-bonded to each other with a melt-bonding glass sample I having a composition shown in the following Table 3 at a high temperature (750° C.).

TABLE 3

| composition | I | J | K |
|---|---|---|---|
| $SiO_2$ | 48.0 | 44.0 | 40.0 |
| $B_2O_3$ | 17.0 | 18.0 | 27.0 |
| $Na_2O$ | 14.5 | 12.0 | 13.5 |
| BaO | 10.5 | 8.0 | 9.5 |
| $Fe_2O_3$ (iron oxide) | 5.6 | 10.0 | 10.0 |
| ZnO (zinc oxide) | 4.4 | 8.0 | — |
| thermal expansion coefficient $\alpha \times 10^{-7}$ [° C.$^{-1}$] | 100 | 93 | 96 |
| glass transition point Tg [° C.] | 545 | 525 | 525 |
| melt-bonding temperature tw [° C.] | 750 | 730 | 720 |

(note) Composition is indicated by weight %, and temperature range of thermal expansion coefficient is 100 to 450° C.

The reason for employing the glass sample I having the composition shown in Table 3 as the melt-bonding glass used for the first melt-bonding process at the ferrite head 14 side is that the sample I has a bonding temperature at which a bonding jig is not deteriorated (i.e., about 750° C. or lower) in order to secure the accuracy in size after the melt-bonding, has a glass transition point which is as high as possible in view of the second melt-bonding process and the succeeding melt-bonding process (process of melt-bonding at the MIG head side), and further seldom reacts to erode and be diffused into the ferrite or the like.

After the melt-bonding at the reproduction gap 11 side was carried out at a high temperature by using the sample glass I having the composition as shown in Table 3 as described above, the melt-bonding at the recording gap 12 side was carried out by using the melt-bonding glass 17 having the melt-bonding temperature which is a temperature where the glass used for the melt-bonding at the reproduction gap 11 side was not molten, i.e., which is lower than the glass transition point of the sample I.

When the sample B according to the embodiment having the composition shown in Table 1, i.e., the composition of PbO of 67.5 weight %, $SiO_2$ of 20.0 weight %, $B_2O_3$ of 5.5 weight %, $TeO_2$ of 4.0 weight %, $Na_2O_2$ of 2.0 weight % and $ZrO_2$ of 1.0 weight % is employed as the melt-bonding glass 17 used for the melt-bonding at the MIG head 15 side, it is possible to carry out the melt-bonding at a low temperature at which the glass bonded at the reproduction gap 11 side is not molten, with keeping the high alkali resistance. On the other hand, if the sample G having the composition shown in Table 1 is employed as the melt-bonding glass 17, then, since the sample glass G has the glass transition point higher than the glass transition point of the sample I by 35° C., the sample glass I at the reproduction gap 11 side is slightly molten upon the melt-bonding of the sample glass G, which prevent a head size from being kept.

The reason for employing as the glass at the MIG head 15 side not any of the melt-bonding glass made of the sample glasses A, C, H shown in Table 1 but the melt-bonding glass made of the sample glass B shown in Table 1, is that since a glass portion of the slide surface 13 of the magnetic head 10 has the largest area among the slide surfaces of the magnetic heads according to the present invention and hence tends to influence a recording medium, it is practically desired to secure the alkali resistance which is higher than that of the sample G shown in FIG. 1.

Figure 3:
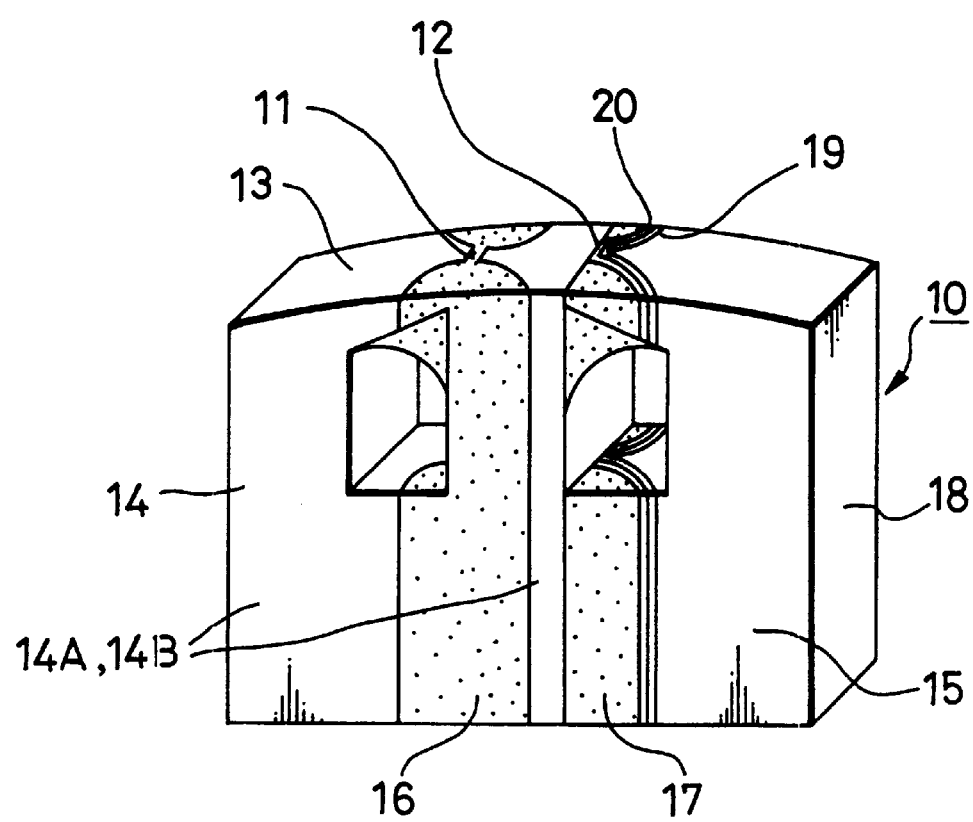
FIG. 3 is a perspective view showing a magnetic head for a data cartridge to which the present invention is applied.

Specifically, according to the magnetic head 10 for a data cartridge of the embodiment shown in FIG. 3, since the melt-bonding glass 16 used for the first melt-bonding process has the glass transition point 545° C. as shown at the sample I of Table 3) while the melt-bonding glass 17 used for the second melt-bonding process has the same composition as that of the sample B shown in Table 1 and has the melt-bonding temperature of 540° C., it is possible to carry out the melt-bonding without melting the melt-bonding glass 16 bonded in the first bonding process again and without changing a size of the reproduction gap, which allows the magnetic head 10 for a data cartridge to be manufactured with keeping the high alkali resistance chemical resistance).

A magnetic head 21 for use with a hard disk drive will be described with reference to FIG. 4. It is frequently observed that a MIG head having a crystalline metal thin film formed by sputtering or the like is employed in a head chip 22 shown in FIG. 4 in order to increase a recording density. When a gap is formed in the head chip 22, a non-magnetic gap film 23 made of $SiO_2$ or the like is formed on the crystalline metal thin film, and it is necessary to bond ferrite-core half bodies 24L and 24R at a temperature which is as low as possible in order to prevent deterioration of its magnetic characteristic.

In view of the above requirement, the sample glass J shown in Table 3 is employed as a melt-bonding glass 25 used for forming the head chip 22 in stead of the sample I used in the magnetic head 10 shown in FIG. 3. Since the sample glass J has the glass transition point of 525° C. which is lower by about 20° C. as compared with that of the sample glass I, when the head chip 22 is inserted in a groove portion 28 of a slider 27 made of ceramics or the like as shown by an arrow A in FIG. 4 and melt-bonded with a melt-bonding glass 26 used for the second melt-bonding process, a melt-bonding glass having a lower melt-bonding temperature as compared with that of the sample glass B shown in Table 1 must be employed as the melt-bonding glass 26.

Therefore, in this embodiment, a glass having the composition as that of the sample C shown in Table 1, i.e., the composition of PbO of 70.0 weight %, $SiO_2$ of 17.0 weight %, $B_2O_3$ of 6.0 weight %, $TeO_2$ of 5.0 weight %, $Na_2O$ of 1.0 weight % and $ZrO_2$ of 1.0 weight % was employed as the melt-bonding glass 26. In this case, in view of the melt-bonding temperature, it is possible to employ the melt-bonding glass made of the sample H shown in Table 1 having the melt-bonding temperature of 520° C. since the glass having the composition as that of the sample C has the melt-bonding temperature of 520° C. The magnetic head 21 manufactured by using the melt-bonding glass made of the sample C according to the embodiment as the melt-bonding glass 26 and the magnetic head 21 manufactured by using the melt-bonding glass made of the sample H according to the comparative example as the melt-bonding glass 26 were compared in chemical resistance. Table 4 shows the compared result.

TABLE 4

| sample | C | H |
|---|---|---|
| unevenness | 0.1 $\mu$m | 0.3 $\mu$m |

Specifically, the magnetic heads 21 in which the head chips 22 were inserted into the groove portions 28 of the sliders 27 by using the melt-bonding glasses 26 made of the samples C and H shown in Table 1 were soaked in a washing solution whose PH was 11 for thirty minutes. Thereafter, it was measured how much glass portions of slide portions 29 of the respective magnetic heads 21 caved (dissolved) in as compared with the slide surfaces of the sliders 27.

Study of Table 4 reveals that the sample glass H was dissolved three times as much as the sample glass C according to the present invention. Therefore, it is advantageous to employ the sample glass C according to the present invention although both of the sample glasses C and H have the same melt-bonding temperature of 520° C. (it may be considered that the sample glass C can secure the practical reliability although it had unevenness of 0.1 $\mu$m produced after being soaked in the washing solution for thirty minutes).

While the sample glass C does not have high alkali resistance which is as high as the sample glass B, the magnetic head 21 does not have an exposed area of the glass which is as large as the magnetic head 10 for a data cartridge. Therefore, it does not cause practical problems to employ the sample glass C in the magnetic head 21.

Further, a magnetic head 30 for use with a floppy disk drive (hereinafter referred to as a FD head) will be described with reference to FIG. 5. The FD head 30 is a head buried type head in which a melt-bonding glass 35 for a first melt-bonding process is used to bond head chip half bodies 34R, 34L for a read/write gap 32 to each other and to bond head chip half bodies 34E, 34F for an erase gap 33 to each other.

When the head chip half bodies 34R, 34L were bonded to each other and the head chip half bodies 34E, 34F are bonded to each other, a sample glass J shown in Table 3 was used. Specifically, a glass composition having the glass transition point of 525° C. and the melt-bonding temperature of 730° C. was selected.

Figure 5:
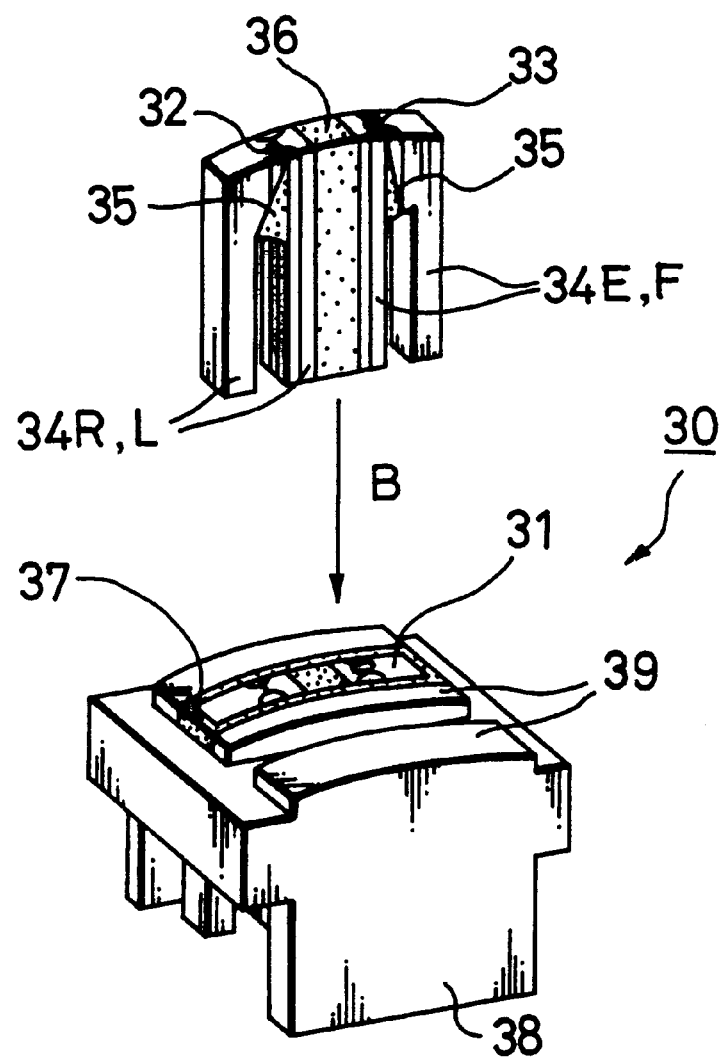
FIG. 5 is a perspective view showing a magnetic head for a floppy disk head to which the present invention is applied.

A head chip forming the read/write gap 32 and a head chip forming the erase gap 33 were bonded to each other by using a melt-bonding glass 36 for a second melt-bonding process as shown in FIG. 5.

The head chip forming the read/write gap 32 and the head chip forming the erase gap 33 were bonded by using the sample glass K having the composition shown in Table 3. The melt-bonding temperature of the sample glass K is 720° C. and considerably exceeds 525° C. which is the glass transition point of the sample glass J. Therefore, for example, when the head chips are bonded to each other in the second melt-bonding process by using the melt-bonding glass, a bonding jig dedicated for an FD head is used to press the head chips so that the respective gap widths of the read/write gap 32 and the erase gap 33 should not be extended. Thus, the gap sizes of the read/write gap 32 and the erase gap 33 established upon the first melt-bonding process are prevented from being changed.

The reason why the sample glass K whose melt-bonding temperature is lower by 10° C. as compared with the sample glass J and used for the first bonding process was employed as the glass used for the second melt-bonding process, is to prevent the glasses of the respective gaps from being corroded and diffused.

The head chip having integrally the read/write gap 32 and the erase gap 33 was inserted into a groove 39 of a slider 38 made of ceramic or the like as shown by an arrow B of FIG. 5 and bonded to the slider 38 by using a melt-bonding glass 37 used for a third melt-bonding process as a spacing filling material. At this time, it is impossible to provide a means for protecting the melt-bonded portions formed in the first and second melt-bonding processes. Therefore, it is necessary to employ a glass having a composition which allow the bonding at a temperature lower than the glass transition point of 525° C. of the melt-bonding glasses 35, 36 respectively used in the first and second melt-bonding processes.

Therefore, the melt-bonding glass made of the sample C having the composition shown in Table 1 was employed as the melt-bonding glass 37 used for the third melt-bonding process in the embodiment. Similarly to the magnetic head shown in FIG. 4, unevenness of the glass portions of the magnetic heads employing the sample glasses C and H was measured in order to examine the chemical resistance of the melt-bonding glass 37 used for the third melt-bonding process of the FD head. The measured result was the same as that of the magnetic head for a hard disk, i.e., the same as shown in Table 4. Therefore, it is possible to obtain the FD head which provide the same effect as that provided by the magnetic head for a hard disk according to the present invention shown in FIG. 4.

It is needless to say that the present invention is not limited thereto and that the present invention can be applied not only to magnetic heads described in the embodiment but also to a field requiring a glass bonding at a portion where a high-temperature heating is not allowed but the chemical resistance is required, e.g., a field of an adhesion glass used for hermetically sealing a semiconductor device and an electric part.

According to the present invention, it becomes possible to carry out the low-temperature melt-bonding by using the melt-bonding glass and to realize the chemical resistance which does not be a practical bar to manufacture and use a magnetic head. Therefore, if this bonding glass is used as a means for the bonding in the magnetic head, then it is possible to prevent a magnetic characteristic of a magnetic-core material or the like from being deteriorated by the heat produced upon the melt-bonding and to prevent a size of the magnetic head from being changed by heating the magnetic head in the plural melt-bonding processes. Moreover, it is possible to suppress the chemical damage of the glass portion caused by the grinding fluid or the like used upon a block working process or the like and to improve a quality of the magnetic head and the yield thereof.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A glass composition comprising:

from about 67 to about 74% by weight of PbO;
from about 11 to about 20% by weight of $SiO_2$;
from about 3 to about 8% by weight of $B_2O_3$;
from about 3 to about 9% by weight of $TeO_2$;
from about 0 to about 3% by weight of $Na_2O$; and
from more than 0 to about 1% by weight of $ZrO_2$, based on the weight of said glass composition, said glass composition having a melt-bonding temperature of less than about 550° C. and exhibiting an alkali resistance determined as a mass change rate in percent after soaking for at least about four hours in a 4N NaOH solution of at least about 77%.

2. A magnetic head including at least one of a gap forming material, a spacing filling material, a bonding material or an insulating material comprising a glass composition and wherein said glass composition comprises:

from about 67 to about 74% by weight of PbO;
from about 11 to about 20% by weight of $SiO_2$;
from about 3 to about 8% by weight of $B_2O_3$;
from about 3 to about 9% by weight of $TeO_2$;
from about 0 to about 3% by weight of $Na_2O$; and
from more than 0 to about 1% by weight of $ZrO_2$, based on the weight of said glass composition, said glass composition having a melt-bonding temperature of less than about 550° C. and exhibiting an alkali resistance determined as a mass change rate in percent after soaking for at least about four hours in a 4N NaOH solution of at least about 77%.

* * * * *